United States Patent [19]

Enk et al.

[11] Patent Number: 4,883,526
[45] Date of Patent: Nov. 28, 1989

[54] METHOD AND APPARATUS FOR SHAPING AND CONVEYING GLASS SHEETS

[75] Inventors: Allan T. Enk; Jennifer R. Wolfe; John W. Borer, all of Toledo, Ohio

[73] Assignee: Libbey-Owens-Ford Co., Toledo, Ohio

[21] Appl. No.: 331,258

[22] Filed: Mar. 30, 1989

[51] Int. Cl.$^4$ ............................................. C03B 23/023
[52] U.S. Cl. ........................................ 65/104; 65/106; 65/107; 65/273; 65/286; 65/287
[58] Field of Search ................. 65/273, 286, 287, 104, 65/106, 107

[56] References Cited

U.S. PATENT DOCUMENTS

| | | | |
|---|---|---|---|
| 3,455,672 | 7/1969 | Dompkowski | 65/273 |
| 3,573,889 | 4/1971 | McMaster et al. | 65/273 X |
| 3,723,085 | 3/1973 | McMaster | 65/273 X |
| 3,846,104 | 11/1974 | Seymour | 65/273 X |
| 4,092,141 | 5/1978 | Frank et al. | 65/273 X |
| 4,187,095 | 2/1980 | Frank | 65/273 X |
| 4,447,252 | 5/1984 | Nocco et al. | 65/287 X |
| 4,606,749 | 8/1986 | Nushi et al. | 65/106 |
| 4,830,649 | 5/1989 | Freidel et al. | 65/273 X |

Primary Examiner—Arthur Kellogg
Attorney, Agent, or Firm—Marshall & Melhorn

[57] ABSTRACT

A process and apparatus for conveying formed, heated glass sheets from a glass forming station, through a glass tempering station, to a lehr, utilizes a shuttle ring conforming in outline and elevation to the marginal edges of the glass sheet. The shuttle ring receives the glass sheet from the lower shaping mold, by the relative downward vertical movement of the lower shaping mold away from the upper shaping mold. The glass sheet thus deposited on and supported by the shuttle ring is transported through the tempering station to the lehr.

16 Claims, 8 Drawing Sheets

METHOD AND APPARATUS FOR SHAPING AND CONVEYING GLASS SHEETS

FIELD OF THE INVENTION

This invention relates generally to the conveyance of formed, heated glass sheets, and more particularly, to a method and apparatus for conveying formed, heated glass sheets from a glass forming station, through a glass tempering station.

BACKGROUND OF THE INVENTION

The bending and tempering of glass sheets is generally well-known in the art. It has become common practice to bend and temper relatively thick sheets of glass e.g., ¼" thickness and greater; however, the conventional methods are not well suited for the bending and especially the tempering of thin sheets of glass.

There is developing a rapidly expanding demand for extremely thin, formed and tempered glass sheets e.g.. ⅛" thickness and less, for use in special laminated windshields, convertible backlights and elsewhere, particularly in the automotive market.

Formed and tempered glass sheets are typically manufactured in a generally continuous process in which a glass sheet is heated in a furnace to its plastic or softening temperature; next, shaped to the desired configuration by press or gravity bending; thereafter, passed through a tempering station in which blasts of air impinge against the surfaces of the formed glass sheet; and finally discharged for further cooling. Conventional tempering methods for thick glass sheets typically include passage of the formed glass sheet through the tempering section on a roller conveyor, during which air is directed onto the top surface of the formed glass sheet, and simultaneously onto the bottom surface of the glass sheet between the rollers. However, thin, formed glass sheets are amenable to deformation during transfer from the forming step through at least the initial stages of tempering, due to the effects of gravity, contact with the roller conveyor and the force of the air blasts on the still-plastic thin glass sheets immediately prior to tempering.

Accordingly, shuttle mechanisms have been devised for receiving thin, formed glass sheets from a forming station and conveying them through a tempering station. Generally, these shuttle devices support the formed glass sheets near the peripheral edges thereof, while conveying the sheets through the tempering station. In this fashion, the conformation of the formed glass sheets is maintained during tempering, and substantially the entire underside of the formed glass sheets is exposed to the tempering air blasts.

U.S. Pat. No. 3,607,200 discloses a vacuum assisted bending apparatus, wherein a shaping frame lifts a glass sheet into engagement with a vacuum mold, presses the glass sheet against the mold, then transfers the formed glass sheet into a cooling section where it is unloaded onto a device for oscillating the formed glass sheet while being cooled. The shaping frame is therefore utilized in both the forming step and the shuttling of the formed glass sheet into the cooling section. Because the formed glass sheet is transferred to an oscillating device in the cooling section which does not provide support only at the marginal peripheral edges of the sheet, the formed glass sheet is subject to deformation thereafter until it is sufficiently cooled below its plastic set temperature.

U.S. Pat. No. 4,092,141 discloses a support ring which receives a formed glass sheet previously held by vacuum on the underside surface of an upper forming mold. The support ring, having the formed glass sheet deposited thereon, is then transported to a tempering station, where the formed glass sheet is unloaded from the support ring onto elevator rolls prior to being fully tempered. Again, distortion of the formed glass sheet may occur as a result of removing it from the support ring while above its plastic set temperature.

U.S. Pat. No. 4,364,765 discloses a carrier mold ring which receives a partially formed glass sheet from the underside surface of a vacuum holder in a furnace, the glass sheet thereafter being fully formed by gravity while contained within the carrier mold ring. The carrier mold ring then transports the formed glass sheet into a tempering zone where the glass is lifted from the carrier mold ring by upward air blasts. The carrier mold ring not only carries the glass sheet, but additionally participates in its molding or shaping.

U.S. Pat. No. 3,684,473 discloses a bending mold which lifts a heated glass sheet, and by the forces of gravity and inertia forms the glass sheet into the desired configuration. The bending mold, supporting the formed glass sheet on the peripheral marginal edges thereof, passes into a tempering zone, and thereafter deposits the formed and tempered glass sheet onto a take away roller conveyor.

U.S. Pat. No. 3,846,104 discloses a method and apparatus wherein a formed glass sheet is released from the undersurface of an upper vacuum mold onto a tempering ring which supports the formed glass sheet at the marginal edges thereof, and thereafter the tempering ring is passed through a cooling section. The tempering ring is laterally positioned to accept the formed glass sheet after the lower shaping mold has retreated from the upper vacuum mold, thereby extending the elapsed time between the forming and cooling operations.

Finally, U.S. Pat. No. 4,339,259 discloses a process whereby a lower mold ring presses a glass sheet against the undersurface of an upper bending mold, and thereafter transports the formed glass sheet through a tempering zone; the parting of the upper mold away from the lower mold ring and the traverse of the lower molding ring through the tempering zone occurring so as to maintain the same elevation of the lower mold ring throughout.

SUMMARY OF THE INVENTION

The present invention is directed toward a novel method and apparatus for conveying a formed, heated glass sheet from a press bending or forming station to a discharge zone, where the formed glass sheet is removed from the conveying apparatus. The invention is particularly suitable for conveying thin glass sheets through a tempering section, prior to removal from the conveying apparatus. The present invention also is particularly suitable for treating thin glass sheets for use in the automotive field.

In accordance with the present invention there is provided a process and apparatus for conveying a formed glass sheet, in a glass treatment system of the type including a furnace for heating a glass sheet to the plastic temperature thereof, a press bending glass forming station for bending the glass sheet into a desired shape, and a discharge zone for discharging the formed and tempered glass sheet, the process comprising the steps of:

(A) positioning a shuttle ring to receive a formed glass sheet, the shuttle ring conforming in outline and elevation to the marginal edges of the formed glass sheet;

(B) transferring the formed glass sheet from a lower shaping mold onto the shuttle ring, by the relative downward vertical movement of the lower shaping mold away from an upper shaping mold;

(C) conveying the shuttle ring, having the formed glass sheet thereon, to a glass discharge zone; and (D) removing the formed glass sheet from the shuttle ring.

In another embodiment of the invention, the shuttle ring and glass sheet are transported between glass tempering blast heads during their conveyance from the forming station to the unloading zone.

BRIEF DESCRIPTION OF THE DRAWINGS

The novel features which are considered characteristic of the invention are set forth with particularity in the appended claims. The invention itself, however, both as to structure and method of use, will best be understood from the accompanying description of specific embodiments, when read in connection with the accompanying drawings in which:

DETAILED DESCRIPTION OF THE PREFERRED EMBODIMENT

Figure 1:
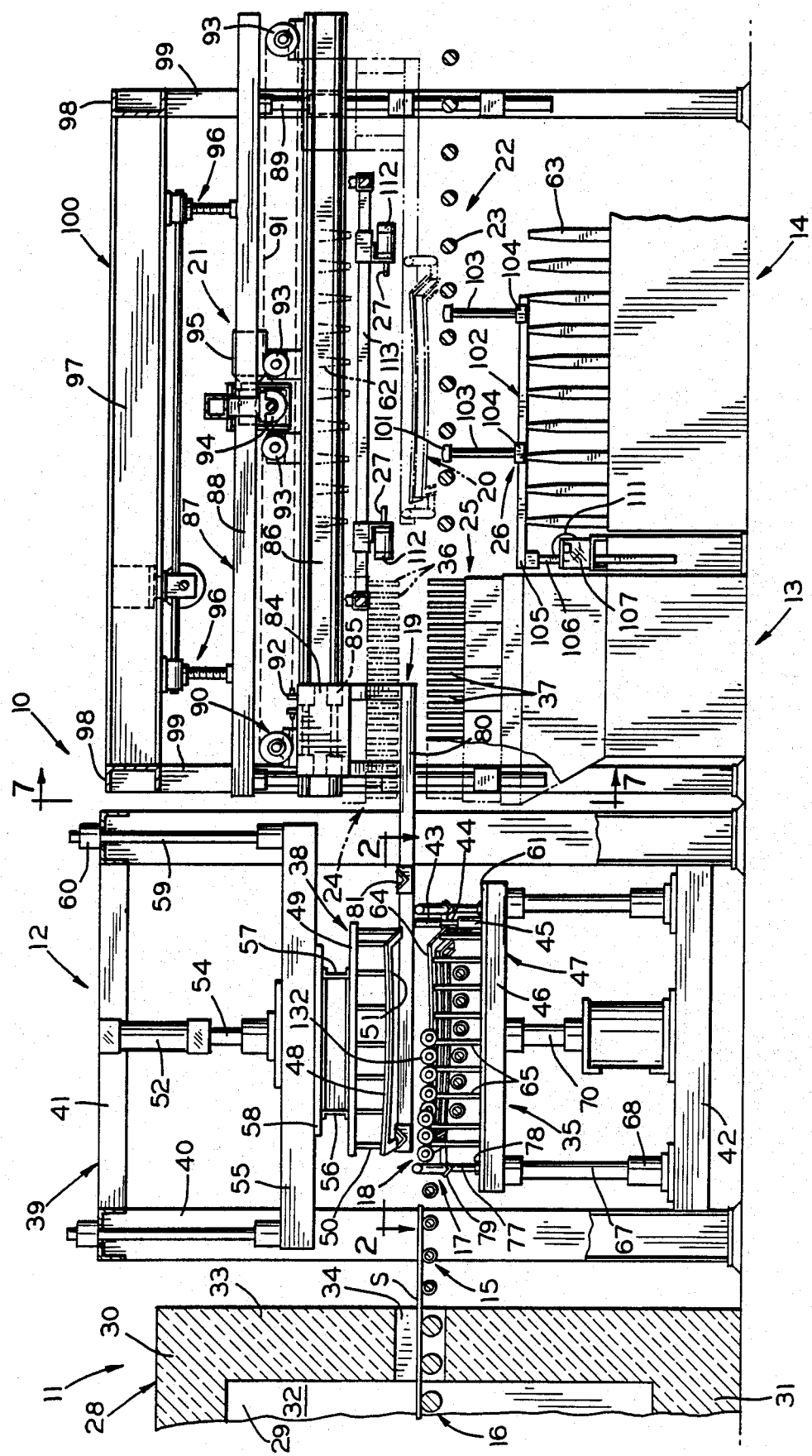
FIG. 1 is a side elevational view of a glass treating apparatus, including portions of a glass sheet heating furnace, a press bending glass forming station, an optional glass tempering section, and portions of a discharge zone.
Figure 2:
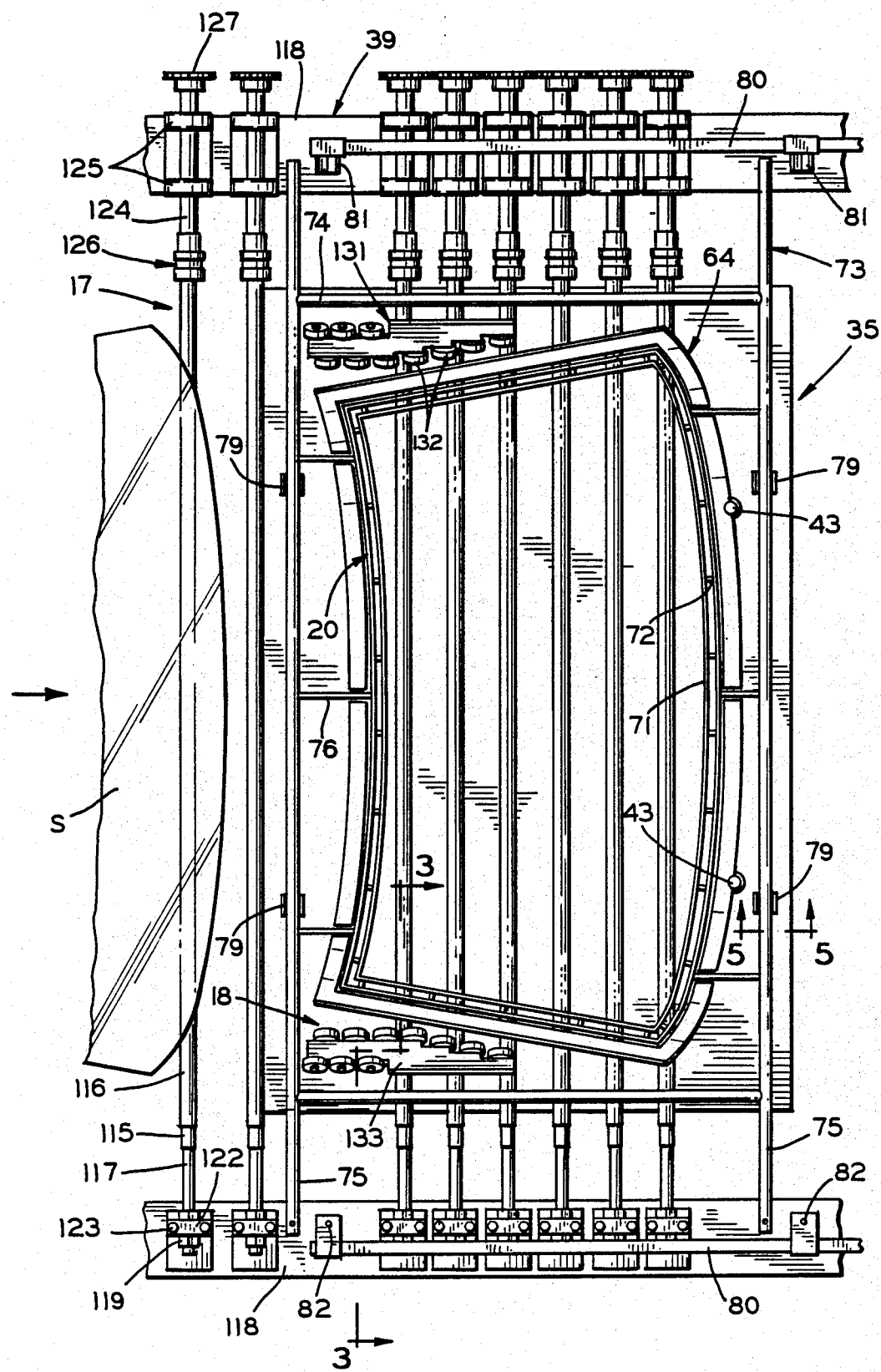
FIG. 2 is an enlarged, top plan view, taken along line 2—2 of FIG. 1, illustrating the location of the novel shuttle ring in relation to the roller conveyor and lower shaping mold.

Referring now to the drawings, and in particular to FIGS. 1 and 2, there is shown a glass sheet bending, tempering and unloading facility, indicated generally at 10, including in sequential alignment a heating furnace 11, a bending or forming station 12, a tempering or otherwise cooling section 13, and an unloading zone 14. Glass sheets S, which are to be formed and thereafter tempered, toughened or otherwise cooled, are conveyed through the initial portion of the facility upon a roller conveyor system, indicated generally at 15, including a series of rolls 16, 17 and 18; a shuttle mechanism indicated generally at 19, including a shuttle ring 20 and a shuttle drive 21 for transporting the glass sheets from the bending and forming station 12 through the tempering section 13 to the unloading zone 14; and finally, a take-away roller conveyor, indicated generally at 22, including take-away rolls 23.

As will be more fully described hereinafter, the initial series of rolls 16 support and convey the glass sheets S generally along a horizontal path through the heating furnace 11, and thence to the bending or forming station 12 where the glass sheets are received by rolls 17 and 18, and positioned for the subsequent bending or forming operation. Following the bending of the glass sheets S to the precise, desired curvature, the formed glass sheets are conveyed on the shuttle ring 20 through an optional tempering section 13, where the surfaces thereof are cooled by passage between opposed blastheads 24 and 25, and thereafter unloaded by the combined action of an elevator 26 and support pins 27 which cooperate to remove the formed and optionally tempered glass sheets S from the shuttle ring 20 and deposit them onto the take-away roller conveyor 22. The formed glass sheets may be subject to cooling at any point following the forming operation, such as for example between conventional cooling blastheads shown generally at 62 and 63.

The heating furnace 11 may be of any conventional construction generally known in the art for heating glass sheets, and in the embodiment illustrated in FIG. 1, comprises a tunnel type structure 28 having a heating chamber 29 defined by a top wall 30, a bottom wall 31, opposite side walls 32, and an end wall 33. Such conventional furnaces are generally heated by suitable heating means such as, for example, gas fired burners or electrical resistance elements (not shown) positioned in the top and sidewalls 30 and 32, and suitably controlled to provide a desired heating pattern for glass sheets S moving through the furnace 11. The glass sheets S are carried through the furnace on the driven rolls 16, which extend from the entrance of the furnace (not shown) through an opening 34 in the end wall 33. As the glass sheets S are conveyed through the chamber 29, they are heated substantially to a temperature above the plastic set temperature of the glass and, upon emerging through the opening 34 in the end wall 33, are received on the rolls 17 and 18 for movement toward and positioning within the bending or forming station 12 between a pair of upper and lower press members which are designed to impart the desired curvature to the glass sheets S. By the term plastic set temperature is meant that temperature below which an applied stress will not cause permanent deformation to the glass sheets, and above which the glass sheets are capable of being molded or shaped. After being formed in the bending station 12, the glass sheets S are deposited onto the shuttle ring 20 by the downward vertical movement of a lower shaping mold 35. The shuttle ring 20, having the formed glass sheet S supported thereon, is advanced generally horizontally and may pass through an optional tempering section 13, whereat the temperature of the surfaces of the formed glass sheets S is rapidly reduced to appropriately temper the formed glass sheets. As illustrated generally in FIG. 1, within the optional tempering section 13, the formed glass sheets S pass between the blastheads 24 and 25, which include a plurality of tubes 36 and 37, respectively, disposed and operable to direct opposed streams of a cooling fluid such as, for example, air, toward and against the opposite surfaces of the formed glass sheets while supported in the shuttle ring 20. It is to be understood that, if the facility is to be used for forming and thereafter annealing glass sheets for windshields and the like, the blastheads 36 and 37 need not be used, and the formed glass sheets are allowed to cool slowly in a controlled environment during the conveying and unloading operations.

The glass sheets S are typically flat as they are introduced into the entrance end of the heating furnace 11, and thus the rollers 16 within the furnace 11 are generally baculiform. As the calescent glass sheets exceed their plastic set temperature and exit from the furnace through opening 34, or even while within the latter stages of the furnace 11, it has been found desirable to provide rollers for contacting with the glass sheets S which are progressively contoured from the straight, cylindrical configuration at the cold end of the furnace 11 toward a shape which substantially conforms to the shape of the finished, formed glass sheets, such as are generally employed at the location of the rollers 17 immediately below the bending or forming station 12. Consequently, the heated glass sheets moving over and contacting the rollers are progressively preformed during their traverse through the exit end and out of the furnace, so that as they move into position for the bending or forming operation, they will have attained a partially formed shape conforming generally to that of their desired final configuration.

As shown in FIG. 1, the bending or forming apparatus at the forming station 12, includes a male upper shaping mold 38 and a female lower shaping mold 35, having generally opposed, complemental shaping surfaces conforming to the curvature to which the glass sheets S are to be formed. The shaping molds 38 and 35 are mounted for reciprocating relative movement toward and away from each other within a structural frame 39. which includes a framework of vertically disposed columns 40 interconnected by horizontally extending beams 41 to form a rigid box-like structure. A horizontally disposed base member 42 extends between the columns 40 for supporting the lower shaping mold 35 and its associated parts.

The upper shaping mold 38 is mounted above the conveyor rollers 17 for vertical reciprocal movement relative to the structural frame 39, and the lower shaping mold 35 is located below the conveyor rolls 17 and is mounted for vertical reciprocal movement toward and away from the upper shaping mold 38.

In order to accurately position the glass sheets S between the upper and lower shaping molds 38 and 35. respectively, there is provided in the path of the advancing glass sheet between adjacent ones of the rolls 17 a pair of laterally spaced locator stops 43. Each stop 43 is affixed to the distal end of a piston rod 44 of a fluid actuated cylinder 45 mounted on the bed 46 of a vertically reciprocating carriage 47. The cylinders 45 are operative to raise and lower the stops 43 between an upper raised position, whereat they protrude above the conveyor rolls 17 into the path of the advancing glass sheets S, and a lower position therebeneath.

The upper shaping mold 38 may comprise a suitable element having a continuous lower surface (not shown) corresponding to the configuration to which the glass sheets S are to be formed or, as illustrated in the preferred embodiment of FIG. 1, may be of outline or ring-type construction, comprising a continuous shaping rail 48 affixed to a base plate 49 by a plurality of connecting rods 50. The upper shaping rail 48 conforms in outline to the glass sheets S to be formed, and is provided with a downwardly directed generally convex shaping surface 51 on its undersurface to impart the desired curvature to the glass sheets S. It is to be understood that the particular outline of the upper shaping rail 48, as well as the specific curved configuration of the shaping surface 51, are dictated by the desired ultimate shape of the glass sheets being formed, and can vary widely to accommodate various configurations.

The upper shaping mold 38 is operably supported by at least one actuating cylinder 52 mounted on one of the horizontally extending beams 41, and having a reciprocal piston rod 54 connected at its free end to a vertically reciprocable platen frame 55. The base plate 49 is affixed to the platen frame 55 for reciprocating movement therewith by means of interconnected structural members 56 and 57 and a support plate 58 extending traversely of the platen frame 55. Guideposts 59, connected at their lower ends to the four corners of the platen frame 55, respectively, extend upwardly through suitable bushings 60 mounted on the upper horizontally extending beams 41 for sliding movement therethrough, to properly guide the platen frame 55 in its vertical reciprocating movement.

The lower shaping mold 35 is also of outline or ring. type construction, and includes a base plate 61 secured to the bed 46 of the carriage 47, and an interrupted lower shaping rail 64 connected in spaced relation to the base plate 61 by a series of connecting posts 65. The lower shaping rail 64 conforms in outline to the glass sheets S to be formed, and is provided on its upwardly directed face with a generally concave shaping surface 66 complementary to the male press member shaping surface 51 in opposed relationship thereto.

The carriage 47 is supported for vertical reciprocating movement by guide members 67 extending into and moveable through bushings 68 affixed to the horizontally disposed base 42. A fluid actuated cylinder 69 mounted on the base 42 includes a piston rod 70 affixed at its distal portion to the bed 46 for moving the lower shaping mold 35 between its lowered position near the conveyor rollers 17 and its raised position thereabove, for lifting the heated glass sheets S from the conveyor rollers 17 and pressing them against the upper shaping rail 48 between the complementary shaping surfaces 51 and 66, to thereby form the glass sheets S precisely to the desired curvature.

The lower shaping rail 64 is made up of a plurality of segments arranged in an end-to-end configuration, in the desired outline pattern and having the required elevations for adjacent segments, so as to conform to the desired shape for the peripheral marginal edges of the glass sheets S to be formed.

Figure 3:
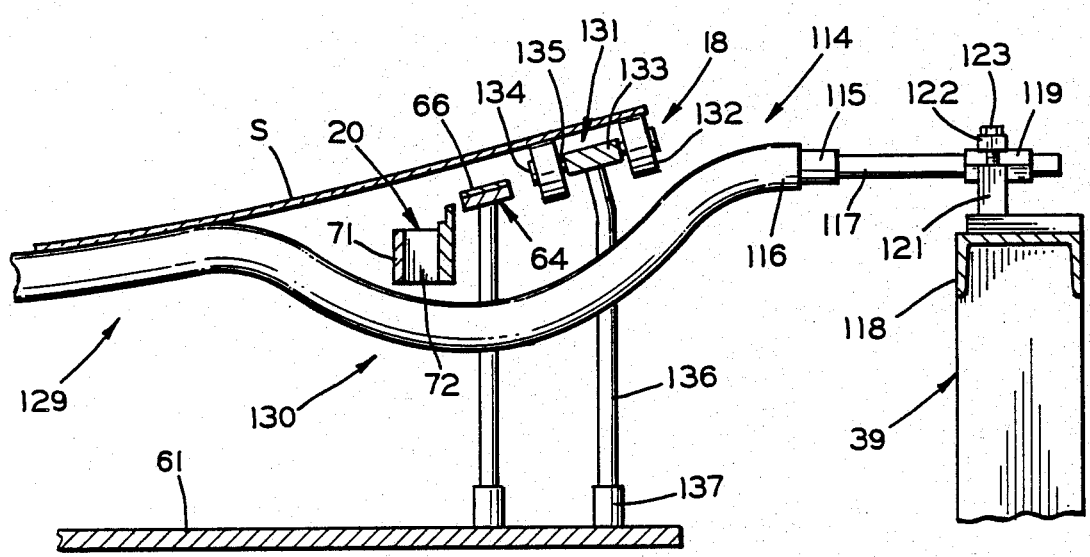
FIG. 3 is a fragmentary, enlarged, front elevational view, partly in section, taken substantially along line 3—3 of FIG. 2.
Figure 4:
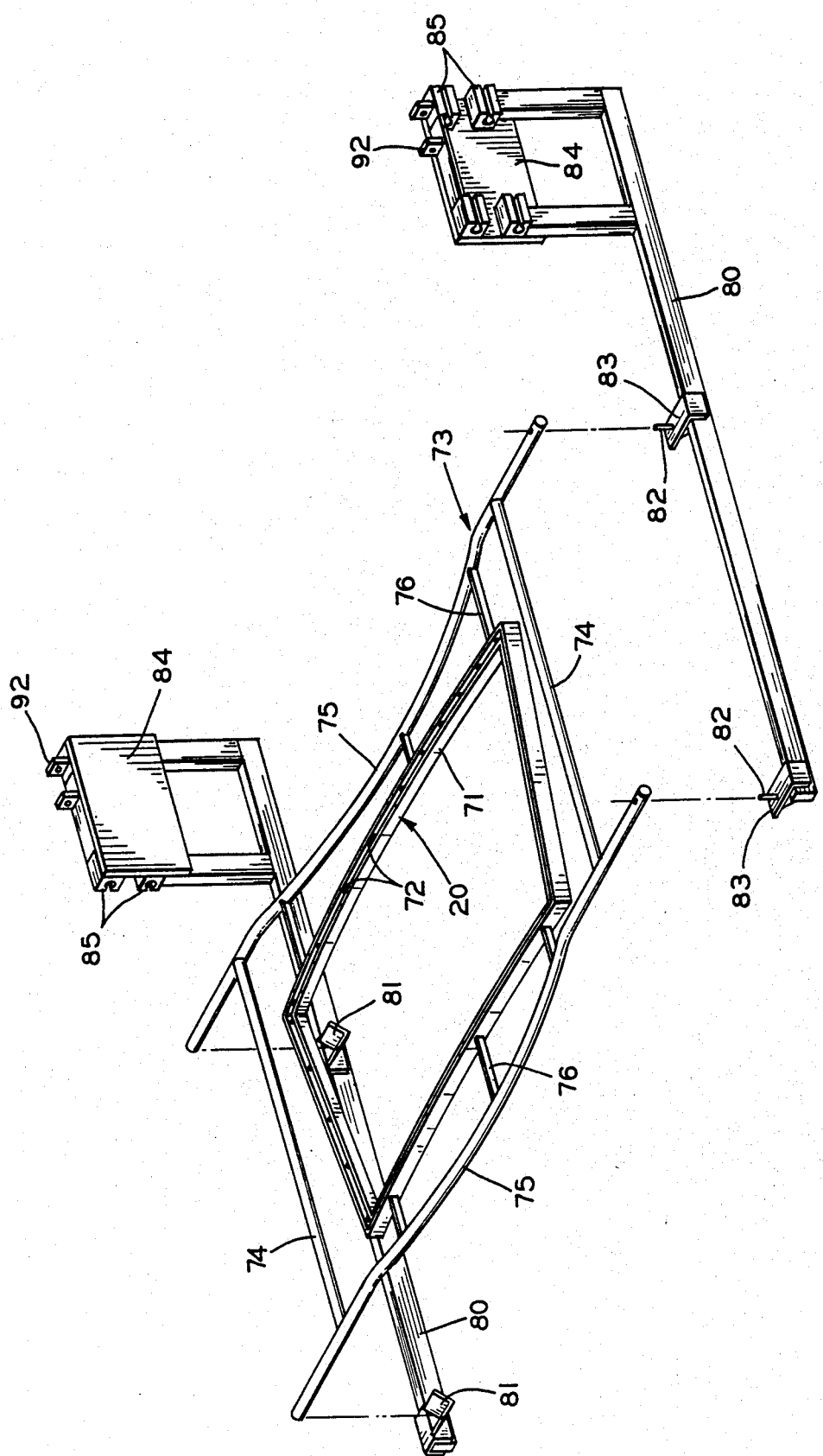
FIG. 4 is a perspective view of the shuttle ring and cantilevered ring support.

As seen in FIGS. 2, 3 and 4, the shuttle ring 20 is generally disposed within and concentric to the lower shaping rail 64, and includes a double parallel rail support member 71 having periodically spaced between the rails thereof cross supports 72. The outline of the shuttle ring 20 conforms substantially to the configuration of the lower shaping rail 64. The shuttle ring 20 is connected to a shuttle frame, generally indicated at 73, comprising two axial support bars 74 aligned generally with the direction of movement of the glass sheets through the facility, two perpendicular support bars 75 connected to the ends of the axial support bars 74 and extending a distance beyond the points of connection, and a plurality of support rods 76 extending between the perpendicular support bars 75 and the outer rail of the double parallel rail support member 71 of the shuttle ring 20. The adjacent segments of the lower shaping rail 64 are spaced apart sufficiently to allow vertical passage therebetween of the support rods 76.

Figure 5:
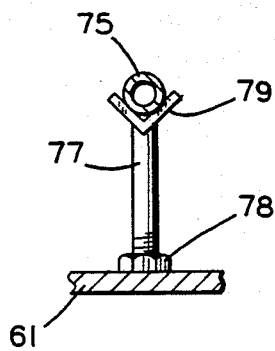
FIG. 5 is an enlarged, vertical sectional view, taken along line 5—5 of FIG. 2.

During the glass sheet bending or forming procedure, wherein the lower shaping rail 64 lifts the glass sheet S into intimate contact with the upper shaping mold 38, the shuttle ring 20 is disposed concentric to and slightly below the lower shaping rail 64, by means of supporting elements comprising support posts 77 threadably secured to the base plate 61 by locknuts 78, and having affixed to the apices thereof notch members 79, whereby the shuttle ring 20 may be properly positioned in relation to the lower shaping rail 64 by engagement between the perpendicular support bars 75 and the notch members 79, as shown in FIG. 5.

Figure 6:
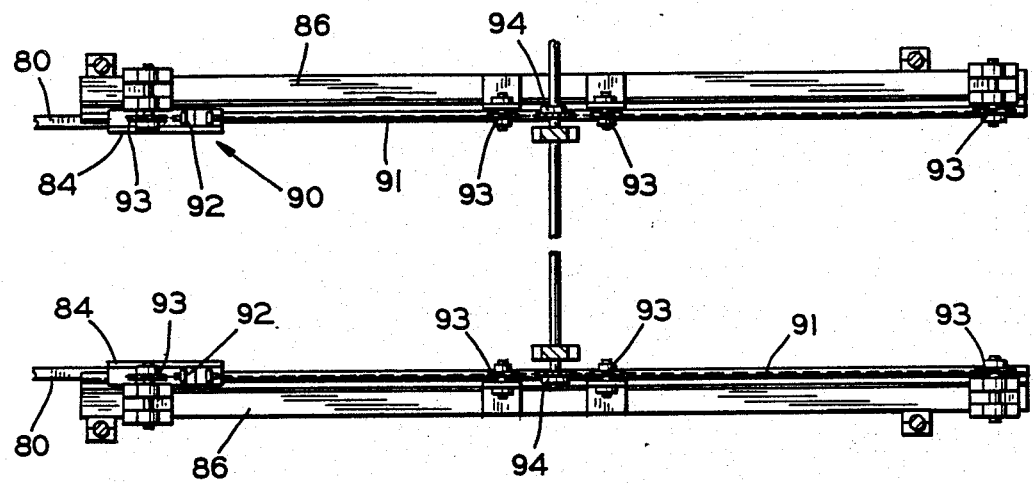
FIG. 6 is a top plan view of portions of the shuttle drive.
Figure 7:
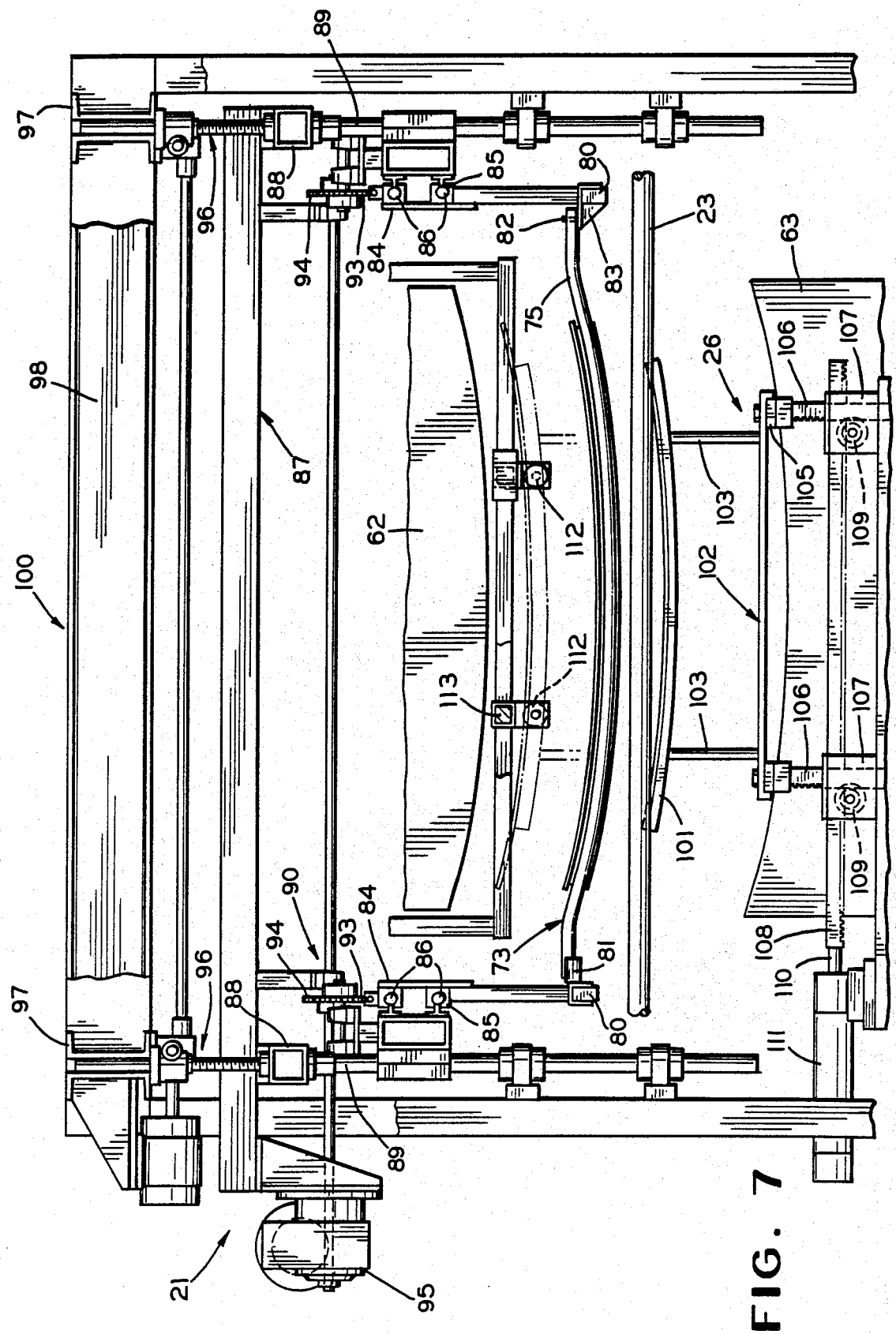
FIG. 7 is an enlarged, vertical sectional view, taken along line 7—7 of FIG. 1, with the tempering blast heads removed for clarity, illustrating the location of the novel shuttle ring and drive mechanism in relation to the glass unloading elevator.

During the formed glass sheet conveying procedure, wherein the shuttle frame 73, including the shuttle ring 20 having a formed glass sheet S supported thereon, is transported to the unloading zone 14, the shuttle frame 73 is supported on and carried by two cantilevered supports 80 which engage the distal portions of the perpendicular support bars 75; at one cantilevered support by the nesting of the distal portions of the perpendicular support bars 75 in notched lifters 81 connected to the cantilevered support, and at the other cantilevered support by the insertion of guide pins 82, affixed to carrier plates 83 attached to the cantilevered support, into apertures in the perpendicular support bars 75. As best seen in FIGS. 4, 6 and 7, the cantilevered supports 80 are rigidly attached to glide plates 84 having multiple bearings 85 which engage horizontal glide rails 86, thereby allowing horizontal movement of the cantilevered supports 80 in alignment with the direction of movement of the glass sheets S through the facility. The glide rails 86 are rigidly attached at their extremities to a shuttle drive frame, indicated generally at 87, including support beams 88 affixed in spaced relation to the glide rails 86 by connecting members 89, and chain actuated driving means 90 whereby the glide plates 84 are urged along the glide rails 86 by drive chains 91, between connectors 92 on the glide plates, which travel over idler sprockets 93 and through a sprocket drive mechanism 94 powered by a motor 95. The support beams 88 are adjustably connected through screw jack mechanisms 96 to overhead main support beams 97 which cooperate with main cross beams 98 and upstanding support columns 99 to form the main shuttle support structure 100. The shuttle ring 20 and formed glass sheet S may optionally be conveyed through a tempering section 13.

During the formed and optionally tempered glass' sheet unloading procedure, as illustrated in FIGS. 1 and 7, the shuttle frame 73 and shuttle ring 20 having a formed and optionally tempered glass sheet thereon are positioned above the take away roller conveyor 22. An elevator, indicated generally at 26, is located below the conveyor 22, and comprises cross supports 101, which are generally shaped to substantially conform to the curvature on the underside of the formed and optionally tempered glass sheets S, and an elevator frame 102 comprising upstanding supports 103 connected at their apices to the cross supports 101 and rigidly connected at their bases to lateral supports 104 which in turn are rigidly affixed to axial support members 105. The axial support members 105 are rigidly attached to vertical lift racks 106 slidably mounted within vertical channels in upstanding elevator support columns 107. The vertical lift racks 106 are designed to elevate and lower the cross supports 101 by the horizontal motion of a drive rack 108 slidably located within horizontal channels in the columns 107. Concentric pinion gears 109, rotatably mounted in the columns 107, engage serations on the vertical lift racks 106 and the drive rack 108, so as to convert the horizonal motion of the drive rack into vertical motion at the vertical lift racks. The drive rack 108 is actuated by an attached piston rod 110 and hydraulic cylinder 111. Actuation of the cylinder 111 causes the lifting of the elevator cross supports 101, from a first position below the take-away rollers 23 of the conveyor 22, to a second position above the elevation of the shuttle ring 20 and within the perimeter defined by the rails of the double parallel rail support member 71. Actuation of the cylinder 111, therefore, results in the lifting of the formed and optionally tempered glass sheet vertically from the shuttle ring 20 to a location above the plane generally defined by the shuttle frame 73. At this elevated location, there are provided support pins 27 which, when extended to their first positions, occupy positions below the undersurface of the elevated glass sheet S, so that as the elevator cross supports 101 are lowered, the formed and optionally tempered glass sheet is deposited upon the extended support pins 27. Conveniently, when the support pins 27 are retracted to their second positions, they retreat from the zone defined by the vertical aspect of the glass sheet, and thereby do not hinder the vertical movement of the elevator cross supports 101 nor the glass sheet S supported thereon. The support pins 27 are mounted in actuating cylinders 112 for horizontal movement between their extended and retracted positions. The actuating cylinders 112 are mounted on frame members 113, which in turn are rigidly affixed to the main shuttle support structure 100.

The contoured conveyor rollers employed at the forming station 12, as best illustrated in FIGS. 2 and 3, are preferably of the type comprising an inner, hollow, stationary core member and an outer, flexible, load-carrying sleeve rotatable thereabout. Such contoured conveyor rolls are disclosed and described in U.S. Pat. No. 3,905,794, which is incorporated herein in its entirety by reference thereto. The construction of this aspect of the rolls per se does not constitute part of the present invention, and reference may be had to the patent for details of the construction of a preferred embodiment of the core member and rotatable sleeve.

As hereinabove explained, contoured rolls of gradually increasing curvature may advantageously be employed leading into the press bending or forming section, beginning at the exit of the furnace 11. These contoured rollers, generally indicated at 17 of FIG. 3, include a core member 115 as of steel tubing and an outer, flexible, load-carrying sleeve 116 surrounding and freely rotatable about the inner core member 115.

At one end of the contoured rolls, the stationary inner core 115 is telescopically received upon and secured to a stub shaft 117 for mounting upon a side rail 118 of the structural framework 39. In order to support the roll end and to secure the inner core 115 against rotation while the sleeve 116 rotates thereabout, a short section 119 of square tubular stock is affixed as by welding about the stub shaft 117. The square tubular section 119 is received in a correspondingly shaped notch of a mounting block 121 affixed to the side rail 118, and secured therein by clamping plates 122 and fasteners 123 threaded into the mounting block 121.

At its other or driving end, the core member 115 likewise telescopically received onto a stub shaft (not shown) which is fixed to the core member 115 and is concentrically journalled within a rotatable collar 124 (see FIG. 2). The collar 124 is journalled for rotation in spaced bearings 125 carried on a side rail 118 of the structural framework 39 at the bending or forming station 12. The end of the outer sleeve 116 is attached to the rotatable collar 124 by a coupling member 126 fixedly secured on the collar 124. A pinion 127, adapted to be driven by a suitable endless drive chain (not shown), is rigidly secured on each collar 124. Driving of the pinion 127 by the drive chain thus rotates the collar 124 about the stationary stub shaft 117 extending thereinto from the core member 115, and in turn, rotates the coupling member 126 so as to cause the outer sleeve 116 to rotate about the core member 115. The endless drive chain is trained about all of the pinions 127 of the contoured rolls in a series for rotating the outer sleeve 116 in unison at the same angular speed about their respective axes.

The rolls may generally assume the contour dictated by their location along the conveyor system, which in turn, is determined by the desired configuration of the sheet at that point. Thus, the contoured rollers heretofore have been of a generally concave configuration in the region beneath the glass sheets, to follow the contours of the glass sheets at any particular location, with their ends mounted substantially in the plane of the roller conveyor system.

In accordance with the present invention, the rolls 17 are configured so as to permit unhindered operation of the lower shaping mold 35 and the shuttle ring 20. Accordingly, as best seen in FIG. 3, the rolls 17 include a generally concave central region 129 which engages the lower surface of the glass sheet S, and end portions 130 which present a generally U shaped configuration, so as to pass beneath the lower shaping rail 64 and shuttle ring 20 while in their lowered positions.

In order to support the end regions of the glass sheets S as they advance into position above the lower shaping rail 64 so as to minimize creation of distortion therein, there is provided near each end of the lower shaping rail a system of free wheeling roller supports, shown generally at 18 in FIGS. 2 and 3. More specifically, roller carriages 131 are strategically located on either side of the lower shaping rail 64 so as to rollingly support the glass sheet S as it advances into position, while simultaneously permitting unhindered vertical movement of the lower shaping rail 64 and shuttle ring 20.

The roller carriages 131 comprise a plurality of wheel-like rollers 132 mounted on a support base 133 for rolling engagement with the lower surface of the glass sheets S. More particularly, the rollers 132 are journalled by means of a bushing 134 upon a stud axle 135 threaded into the support base 133 for free wheeling movement. The rollers 132 are preferably covered by a suitable material such as a glass fiber cloth to provide a resiliently yieldable, heat resistant, non marring surface for engaging the underside of the glass sheets S. The rolls 18 are strategically located so as to support the end areas of the glass sheets S, along and adjacent to the end segments of the lower shaping rail 64, in the region not engaged by the contoured rolls 17.

To avoid sliding movement between the sleeves 116 and the undersurface of the glass sheets S, the rollers 132 are preferably aligned with the path of the advancing glass sheets. The rollers 132 are likewise preferably maintained normal to the undersurface of the glass sheets S. Accordingly, the roller carriages 131 are supported from mounting posts 136 threaded into the base 61 and secured by jam nuts 137. It is apparent that provision is made for the vertical adjustment of the roller carriages 131 by the positioning of the jam nuts 137 upon the threaded portions of the mounting posts 136, to selectively position the rolls 18 for proper support of the end regions of the glass sheets S.

Briefly reviewing the operation of the invention, glass sheets S are carried through the furnace 11 by a roller conveyor system 15, and simultaneously their temperature is gradually increased to a point above the plastic set temperature. The heated glasssheets S are received from the furnace 11 onto contoured rolls 17 whereupon they tend to sag into conformity with the rolls as they advance into position for forming between the upper and lower shaping molds 38 and 35. The end portions of the glass sheets S are rollingly received upon and supported by the rolls 17 and roller carriages 18 as they pass thereover, into position for the press forming operation. The leading edge of the glass sheets S engage the locator stops 43 when the sheets are properly positioned. The glass sheets S are then lifted from the contoured rolls 17 by the lower shaping rail 64, and intimately contacted and formed against the upper shaping mold 38. During the lifting and forming of the glass sheets. the shuttle ring 20 is at all times positioned concentrically within and slightly below the lower shaping rail 64. As the lower shaping rail parts from the upper shaping mold 38 by downward vertical movement, the lower shaping rail 64 deposits the formed glass sheet S upon the shuttle ring 20 which remains suspended below the upper shaping mold 38 by the resting of the shuttle frame 73 upon the cantilevered shuttle supports 80. It is apparent that substantially the same result would be achieved by vertically raising the upper shaping mold 38 and this shuttle ring 20 away from the lower shaping rail 64, thereby depositing the glass sheet S onto the shuttle ring 20. However, the structure for such an alternate embodiment is not shown. The inventive concept is, therefore, best described herein in terms of depositing the formed glass sheet onto the shuttle ring by the relative downward vertical movement of the lower shaping mold 35 away from the upper shaping mold 38. As the lower shaping rail continues its descent to its original position amongst the contoured rolls 17, the shuttle ring is transported horizontally by the shuttle drive mechanism 21 to an unloading zone 14 where the formed glass sheet S is removed from the shuttle ring 20 by the combined action of the elevator 26 and support pins 27 and deposited upon a series of takeaway rollers 23. In another embodiment of the present invention, the shuttle ring 20 ad formed glass sheet S supported thereon are transported between glass tempering heads 24 and 25 during their conveyance from the forming station 12 to the unloading zone 14. Following the unloading operation, the shuttle ring 20 is repositioned, via the shuttle drive mechanism 21, to its original position concentric to and slightly below the lower shaping rail 64.

FIGS. 8 through 18 more specifically illustrate the operation of the shuttle mechanism during a complete cycle of operation.

Figure 8:
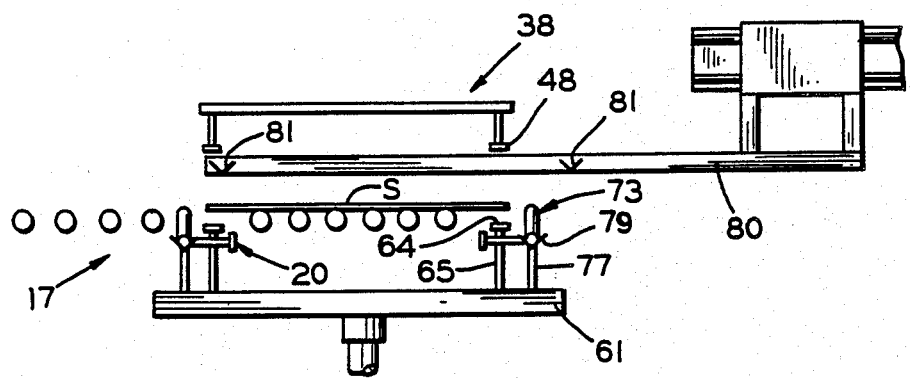
FIGS. 8 through 18 are schematic, side elevational views of the shuttle, illustrating its operation during the various stages of glass sheet forming and unloading operations, including an optional tempering operation.

FIG. 8 illustrates the positioning of the shuttle ring 20 with respect to the shuttle mechanism and tooling. The shuttle ring 20 is located concentric to and slightly below the lower shaping rail 64, and the shuttle frame 73 is resting in the notch members 79 of the support posts 77 which, like the connecting posts 65 of the lower shaping rail 64, are secured to and ride upon the lower base plate 61. A glass sheet S is shown positioned on the rolls 17 ready for forming by pressing against the upper shaping rail 48 of the upper shaping mold 38. Also shown are the cantilevered supports 80 and notched lifters 81, located displaced horizontally so as not to interfere with the forming operation.

Figure 9:
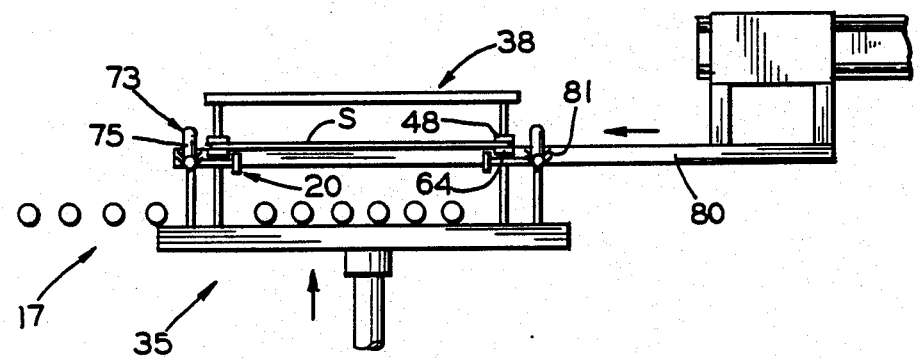

In FIG. 9, the lower shaping mold 35 is raised so that the lower shaping rail 64 engages and lifts the glass sheet S from the rolls 17 and presses it against the upper shaping rail 48, thereby forming the glass sheet S to the desired final curvature. As can be seen, the shuttle ring 20 remains at all times concentric to and slightly below the lower shaping rail 64 during the forming operation. While the glass sheet is being pressed between the lower and upper shaping mold 35 and 38, respectively, the shuttle drive causes the cantilevered supports 80 to shift laterally to a position whereat the notch lifters 81 and guide pins (not shown) will intercept the perpendicular support bars 75 of the shuttle frame 73, upon the descent of the lower shaping mold 35.

Figure 10:
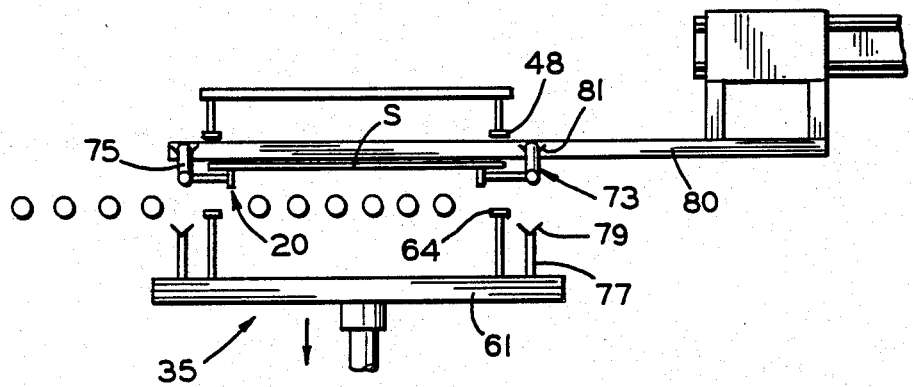

FIG. 10 illustrates the shuttle frame 73 and shuttle ring 20, having the formed glass sheet S thereon, supported by the notched lifters 81 and guide pins (not shown) of the cantilevered supports 80. Although not specifically illustrated, the formed glass sheet S is lowered by the downward vertical movement of the lower shaping rail 64 as it parts from the upper shaping rail 48, and as the lower shaping rail 64 and lower shaping mold 35 continue to descend, the perpendicular support bars 75 of the shuttle frame 73 are intercepted by the notched lifters 81 and guide pins of the cantilevered supports 80 thereby separating the perpendicular support bars 75 from their previous engagement with the notch members 79 of the support posts 77 attached to the lower base plate 61.

Figure 11:
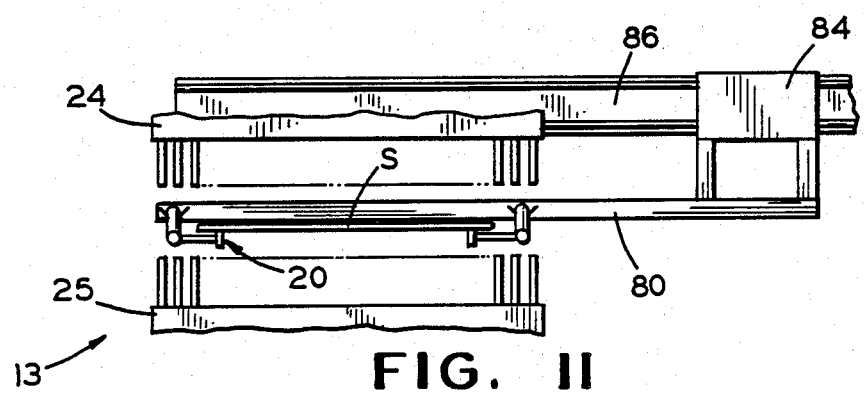

FIG. 11 shows the traverse of the shuttle ring 20 and formed glass sheet S through an optional tempering section 13, where the formed glass sheet is tempered by the impingement of a cooling fluid from blastheads 24 and 25. Lateral movement of the shuttle and cantilevered supports 80 is accomplished by the movements of the glide posts 84 along the glide rails 86, urged by the shuttle drive (not shown).

Figure 12:
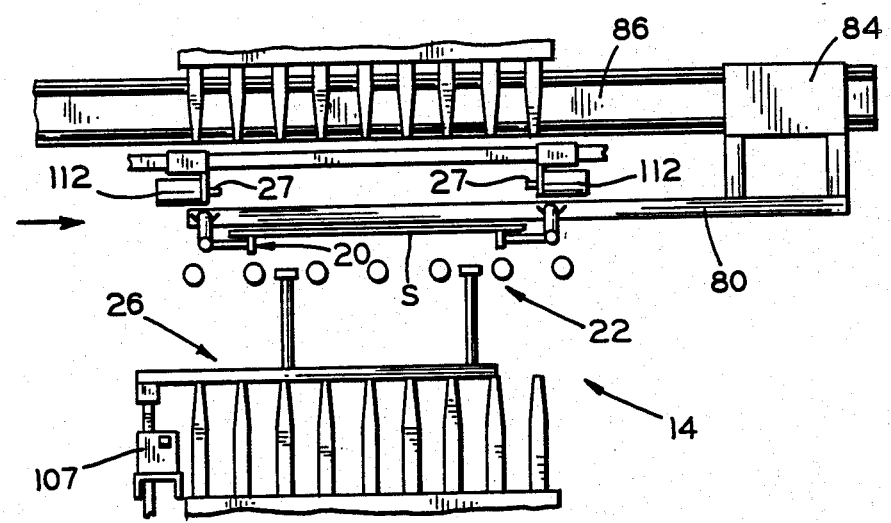

In FIG. 12, the shuttle ring 20 is shown positioned in the unloading zone 14, with respect to the shuttle mechanism, elevator 26 and take-away roller conveyor 22.

Figure 13:
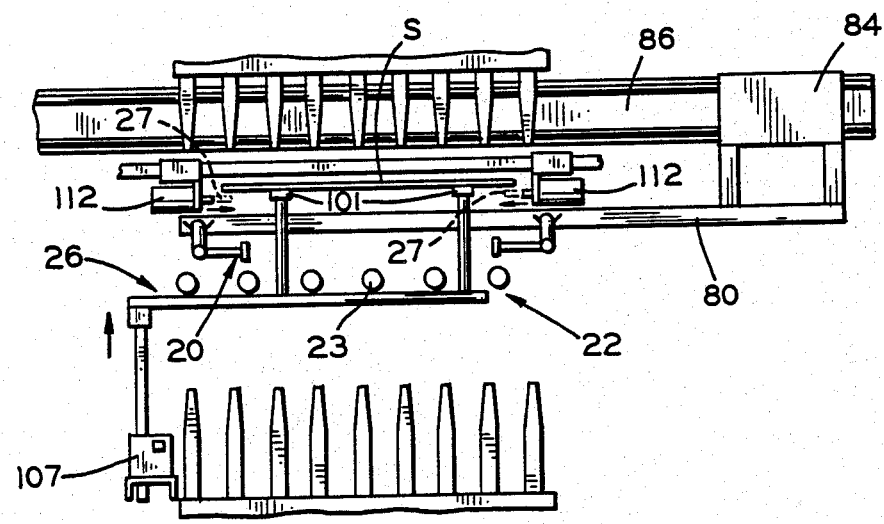

FIG. 13 illustrates a portion of the formed and optionally tempered glass sheet unloading procedure, wherein the cross supports 101 of the elevator 26 are raised from their initial position below the take-away rolls 23 of the conveyor 22, to engage and lift the glass sheet S from the shuttle ring 20 to an elevation whereat support pins 27 may be extended from actuating cylinders 112 to positions beneath the undersurface of the elevated glass sheet S.

Figure 14:
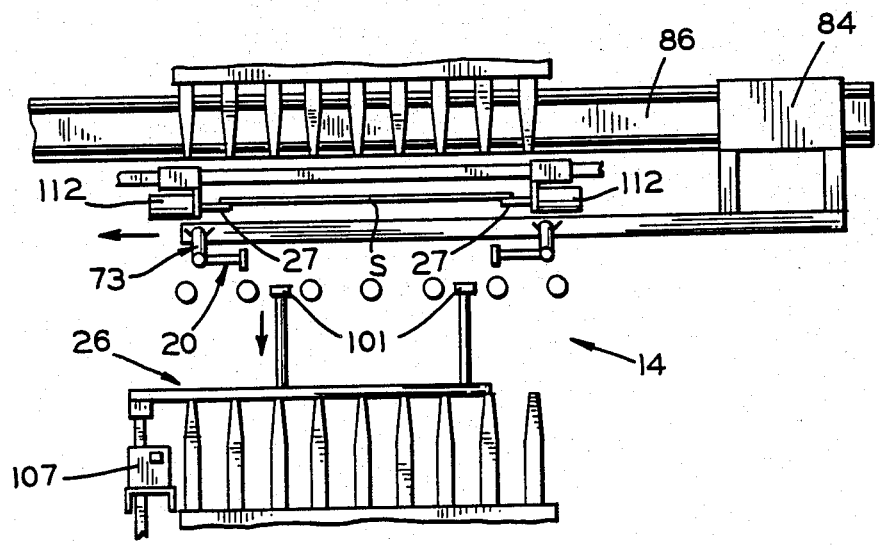

FIG. 14 shows the lowering of the cross supports 101 to a position below the shuttle frame 73, and the resultant deposition of the formed and optionally tempered glass sheet S onto the support pins 27. Following this operation, the shuttle frame 73 and ring 20 may be removed unhindered from the unloading zone 14, to a location at the forming station, by movement of the glide plates 84 along the glide rails 86.

Figure 15:
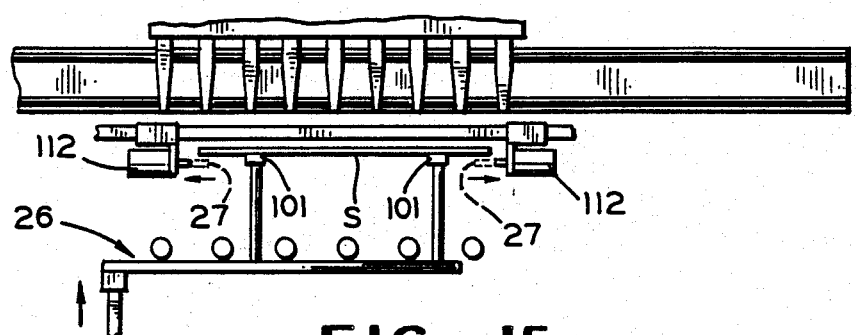

FIG. 15 illustrates another portion of the unloading procedure, wherein the cross supports 101 of the elevator 26 are again lifted to engage and raise the glass sheet S from the support pins 27 which thereafter are retracted into the actuating cylinders 112.

Figure 16:
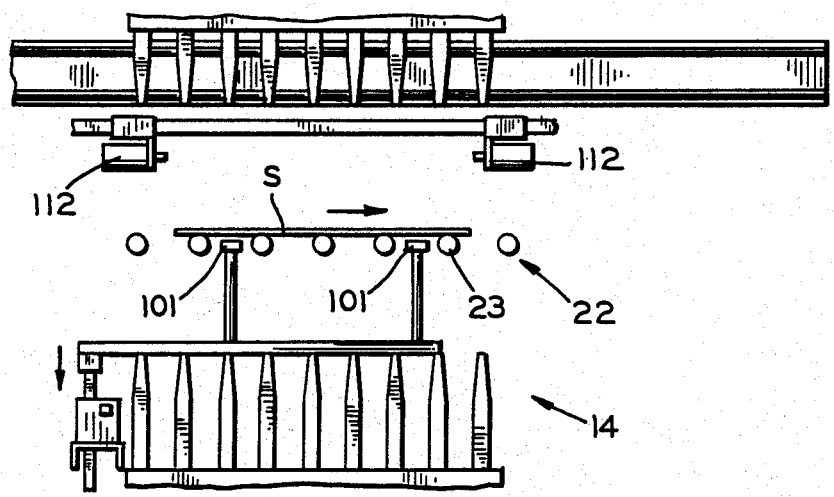

In FIG. 16, the remainder of the unloading operation is conducted, wherein the elevator cross supports 101 are lowered to a point beneath the take-away roller conveyor 22, thereby causing the underside of the formed and optionally tempered glass sheet S to contact the take-away rolls 23, for discharge from the unloading zone 14.

Figure 17:
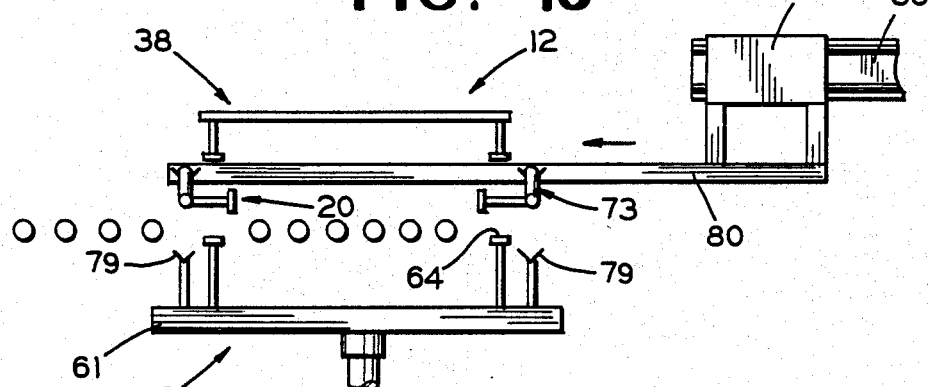

FIG. 17 illustrates the positioning of the shuttle frame 73 and shuttle ring 20 upon return of the shuttle from the unloading zone to the forming station 12.

Figure 18:
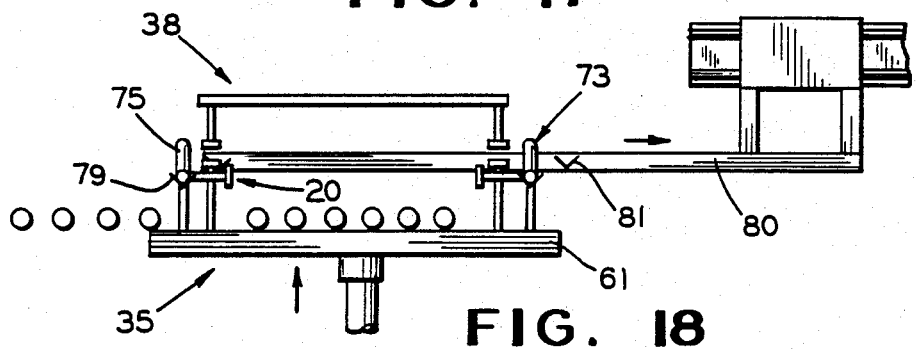

FIG. 18 shows the lifting of the shuttle frame 73 from the cantilevered supports 80, by engagement of the notch members 79 with the shuttle frame perpendicular support bars 75 upon the ascent of the base plate 61 of the lower shaping mold 35. Also shown is the lateral displacement of the cantilevered supports 80, which occurs after the shuttle frame 73 is lifted from the cantilevered supports 80 by the upward movement of the base plate 61, so as to allow the unhindered descent of the lower shaping mold 35 and the shuttle frame 73 and ring 20 thereon, to the position shown in FIG. 8.

While certain representative embodiments and details have been shown for purposes of illustrating the present invention, it will be apparent to those ordinarily skilled in the art that various changes in applications can be made therein, and that the invention may be practiced otherwise than as specifically illustrated and described without departing from its spirit and scope. For example, the shuttle mechanism may be employed to pass formed glass sheets through any cooling process other than tempering.

What is claimed is:

1. A process for conveying a formed glass sheet, in a glass treatment system of the type including a furnace for heating a glass sheet to the plastic temperature thereof, a press bending glass forming station for bending the glass sheet into a desired shape, and an unloading zone for discharging the formed glass sheet, the process comprising the steps of:
   (A) positioning a shuttle ring to receive a formed glass sheet, the shuttle ring conforming in outline and elevation to the marginal edges of the formed glass sheet;
   (B) transferring the formed glass sheet from a lower shaping mold onto the shuttle ring, by the relative downward vertical movement of the lower shaping mold away from an upper shaping mold;
   (C) conveying the shuttle ring having the formed glass sheet thereon, to a glass discharge zone; and
   (D) removing the formed glass sheet from the shuttle ring.

2. The process for conveying a formed glass sheet according to claim 1, wherein during step A, the shuttle ring is positioned concentric with and slightly below a lower shaping rail of the lower shaping mold.

3. The process for conveying a formed glass sheet according to claim 2, wherein prior to step B, the shuttle ring is transferred from its engagement with the lower shaping mold to its engagement with a shuttle mechanism for conveyance of the shuttle ring to the unloading zone.

4. The process for conveying a formed glass sheet according to claim 3, wherein the formed glass sheet is at least partially cooled during either or both of steps C and D.

5. The process for conveying a formed glass sheet according to claim 4, wherein the formed glass sheet is removed in step D by lifting from the shuttle ring and thereafter placing the formed glass sheet onto takeaway rolls.

6. A process for conveying and tempering a formed glass sheet, in a glass treatment system of the type including a furnace for heating a glass sheet to the plastic temperature thereof, a press bending glass forming station for bending the glass sheet into a desired shape, a tempering section for tempering the formed glass sheet, and an unloading zone for discharging the formed and tempered glass sheet, the process comprising the steps of:
  (A) positioning a shuttle ring to receive a formed glass sheet, the shuttle ring conforming in outline and elevation to the marginal edges of the formed glass sheet;
  (B) transferring the formed glass sheet from a lower shaping mold onto the shuttle ring by the relative downward vertical movement of the lower shaping mold away from an upper shaping mold;
  (C) conveying the shuttle ring, having the formed glass sheet thereon, through a tempering section, whereat surfaces of the formed glass sheet are chilled by the contact of a cooling fluid therewith to temper the formed glass sheet; and
  (D) removing the formed and tempered glass sheet from the shuttle ring.

7. The process for conveying and tempering a formed glass sheet according to claim 6, wherein prior to step B, the shuttle ring is transferred from its engagement with the lower shaping mold to engagement with a shuttle mechanism for conveying the shuttle ring through the tempering section and thereafter to the unloading zone.

8. The process for conveying and tempering a formed glass sheet according to claim 7, wherein the formed glass sheet is further cooled after step C.

9. The process for conveying and tempering a formed glass sheet according to claim 8, wherein the formed and tempered glass sheet is removed in step D by lifting from the shuttle ring and thereafter placing the formed and tempered glass sheet onto take-away rolls.

10. Apparatus for conveying a formed glass sheet, in a glass treatment system of the type including a furnace for heating a glass sheet to the plastic temperature thereof, a press bending glass forming station for bending the glass sheet into a desired shape, optionally a tempering station for tempering the formed glass sheet, and an unloading zone for discharging the glass sheet, the apparatus comprising:
  (A) a shuttle ring conforming in outline and elevation to the marginal edges of the formed glass sheet;
  (B) a first support means for positioning the shuttle ring concentric with and slightly below a lower shaping rail of a lower shaping mold during a press bending glass forming operation in which the lower shaping mold contacts an upper shaping mold thereby forming the glass sheet;
  (C) a second support means for positioning the shuttle ring to engage and support the formed glass sheet upon the relative downward vertical movement of the lower shaping mold away from the upper shaping mold;
  (D) means for conveying the shuttle ring and formed glass sheet supported thereon away from the upper and lower shaping molds; and
  (E) an unloading means for removing the formed glass sheet from the shuttle ring.

11. The apparatus for conveying a formed glass sheet according to claim 10, wherein the shuttle ring is attached to a shuttle frame by a plurality of support rods which are adapted to pass vertically between interruptions in the lower shaping rail.

12. The apparatus for conveying a formed glass sheet according to claim 10, wherein the first support means provides for movement of the shuttle ring and lower shaping rail in unison thereby maintaining their relative spacial relationship during the glass sheet lifting and forming operations.

13. The apparatus for conveying a formed glass sheet according to claim 12, wherein the second support means includes cantilevered supports adapted to engage a shuttle frame rigidly attached to and generally surrounding the shuttle ring.

14. The apparatus for conveying a formed glass sheet according to claim 13, wherein the conveying means includes a shuttle framework, drive means mounted on the shuttle framework, glide rails horizontally attached to the shuttle framework and glide plates connected to the cantilevered supports and slidably mounted on the glide rails, the drive means adapted to urge the glide plates along the glide rails so as to generally horizontally move the shuttle ring between the glass forming station and the unloading zone.

15. The apparatus for conveying a formed glass sheet according to claim 12, wherein the conveying means further includes means for conveying the shuttle ring and formed glass sheet supported thereon through a tempering station, whereat surfaces of the formed glass sheet are chilled by the contact of a cooling fluid therewith to temper the formed glass sheet.

16. The apparatus for conveying a formed glass sheet according to claim 12, wherein the unloading means includes means for lifting the formed glass sheet from the shuttle ring and thereafter placing the formed glass sheet onto takeaway rollers.

* * * * *